Inventor
P. H. Burnell,

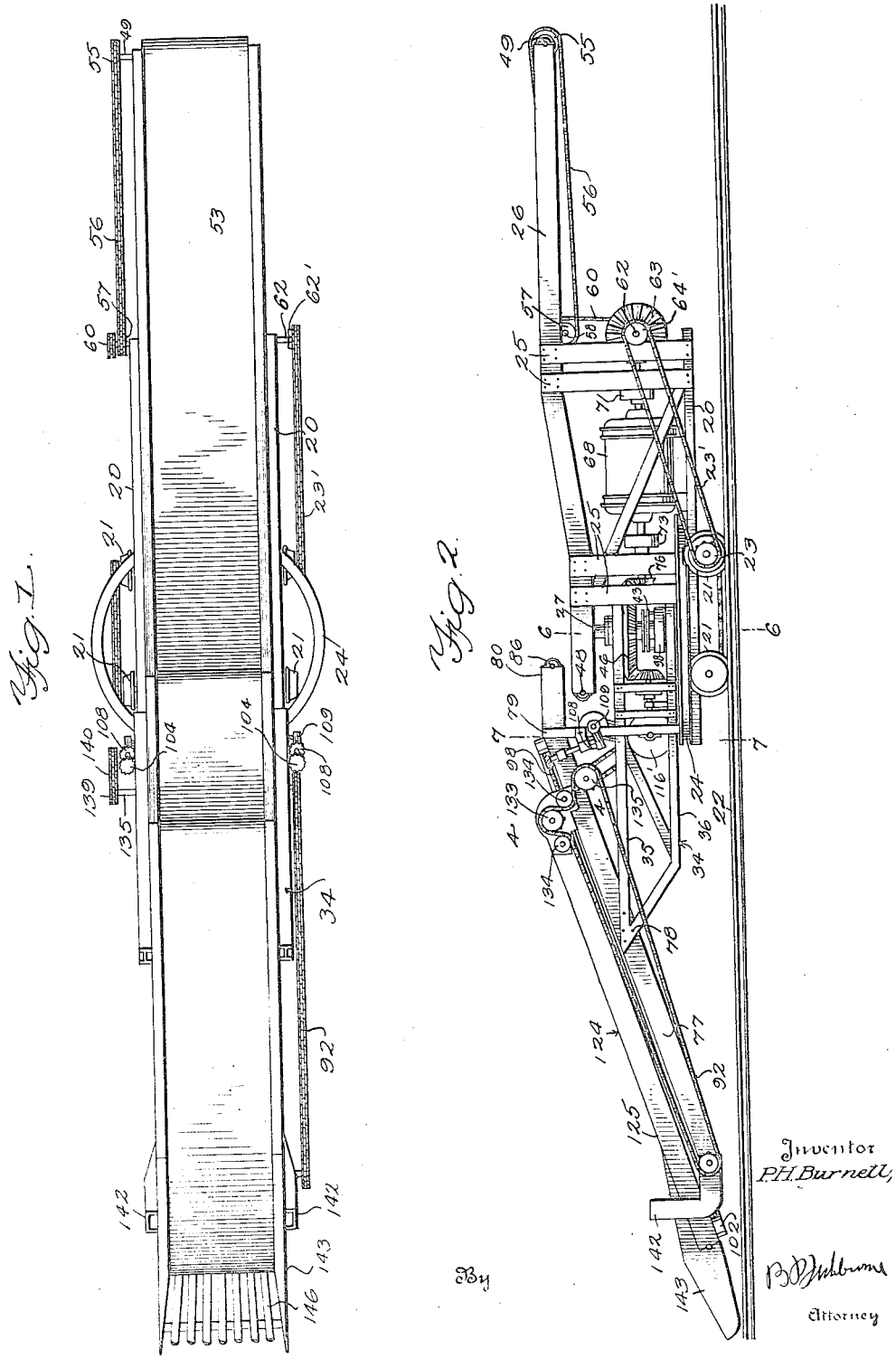

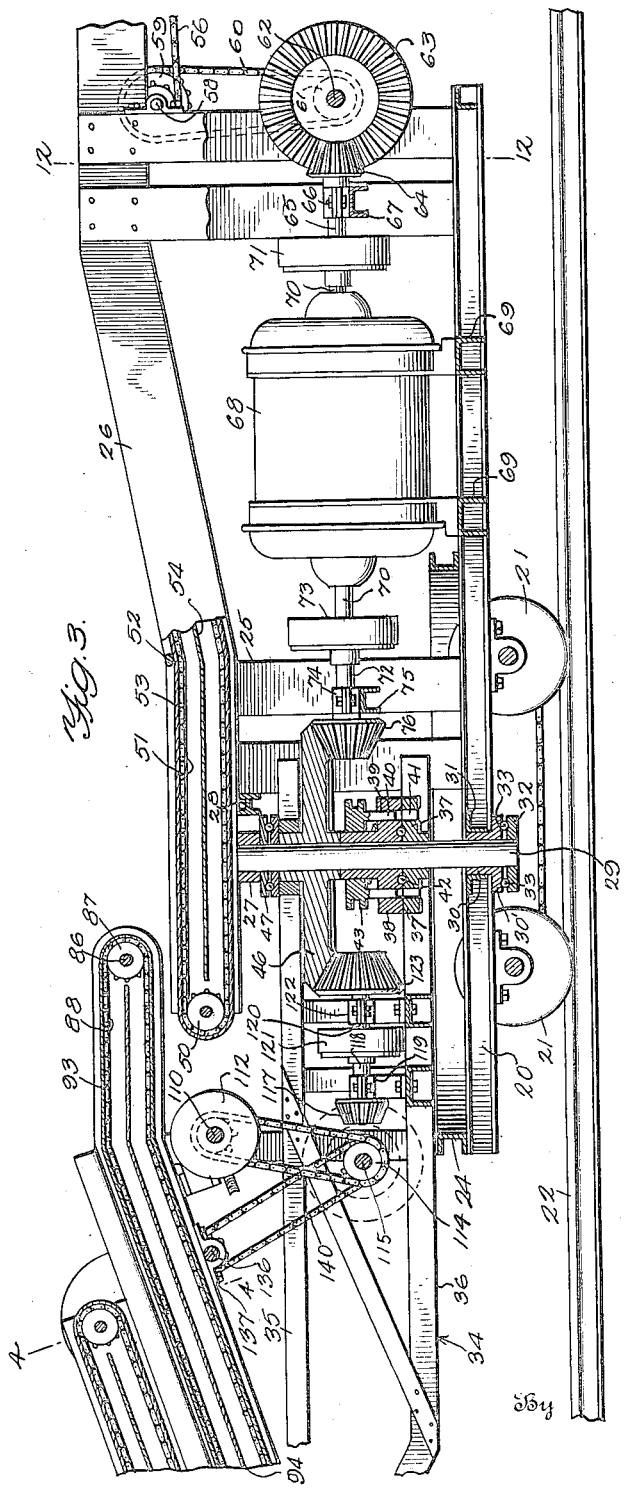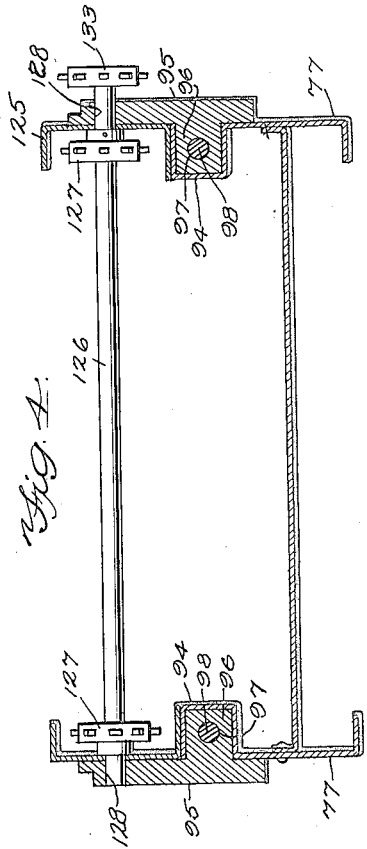

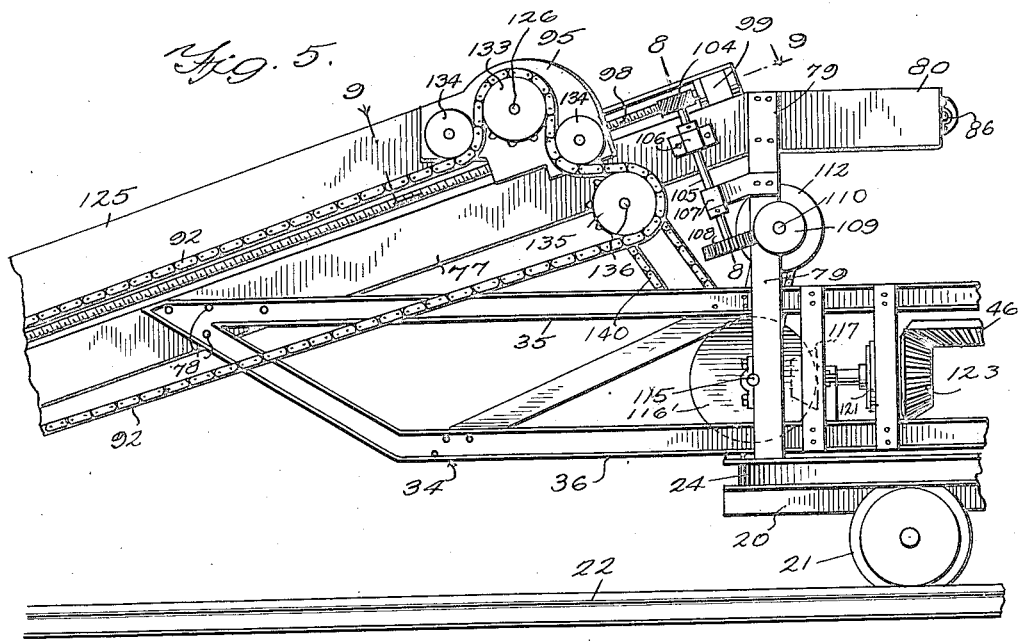
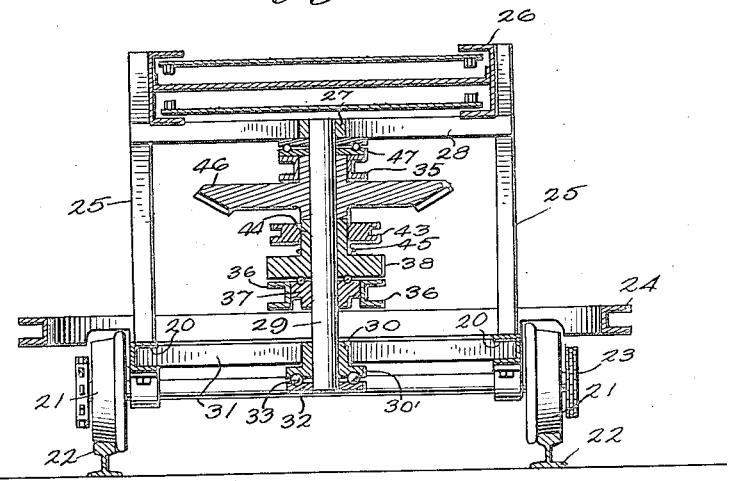

Mar. 20, 1923.
P. H. BURNELL.
COAL LOADING MACHINE.
FILED MAY 23, 1921.
1,449,088.
5 SHEETS—SHEET 5.
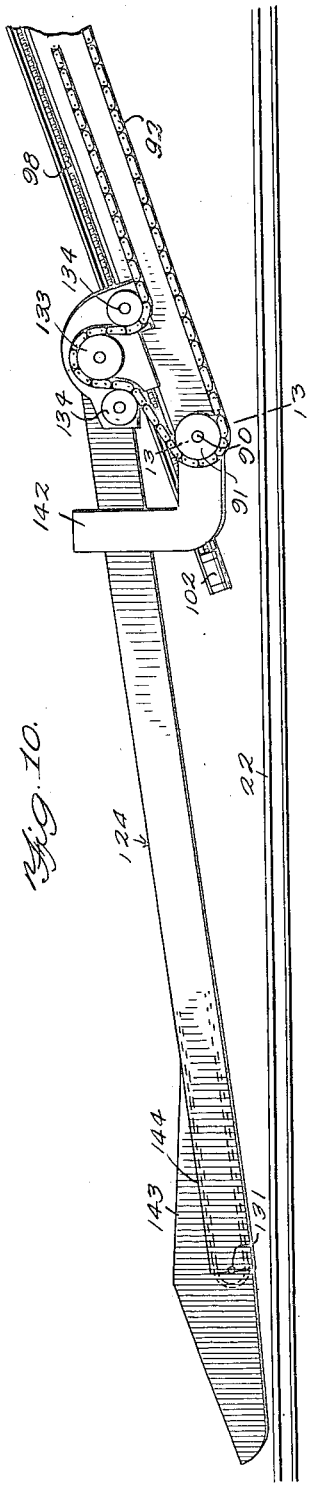
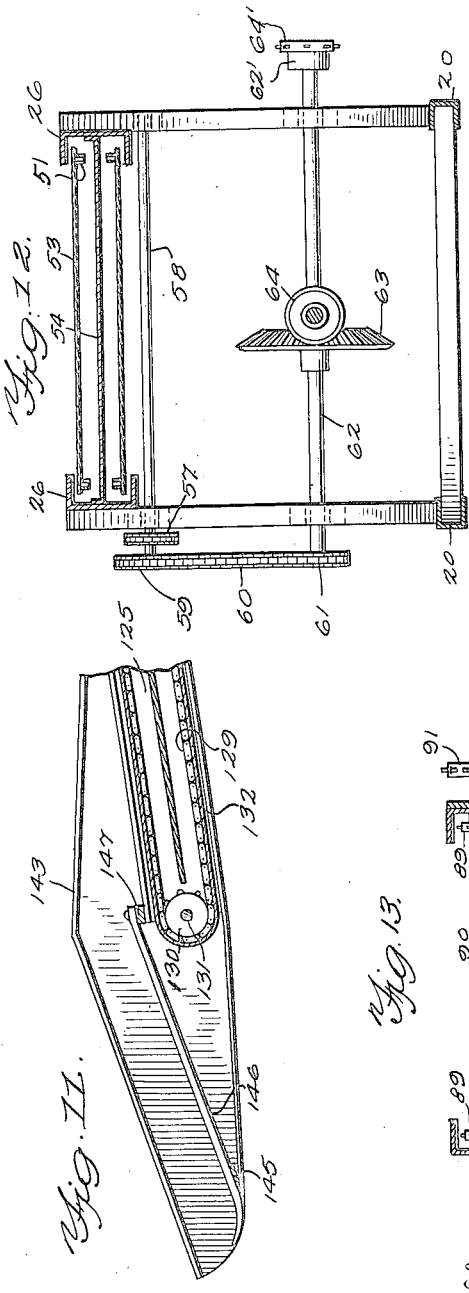
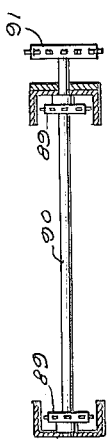
Inventor
P. H. Burnell
By
B. P. Fishburne
Attorney Patented Mar. 20, 1923.

1,449,088

UNITED STATES PATENT OFFICE.

PATRICK H. BURNELL, OF ROCK SPRINGS, WYOMING.

COAL-LOADING MACHINE.

Application filed May 23, 1921. Serial No. 471,748.

*To all whom it may concern:*

Be it known that PATRICK H. BURNELL, a citizen of the United States, residing at Rock Springs, in the county of Sweetwater and State of Wyoming, has invented certain new and useful Improvements in a Coal-Loading Machine, of which the following is a specification.

My invention relates to a loading machine adapted for handling coal, or the like.

An important object of the invention is to provide a machine of the above mentioned character, having a large range of adjustment, whereby the coal may be gathered from different points, without shifting the entire machine.

A further object of the invention is to provide conveying means embodying upper and lower conveyors, with means to longitudinally adjust the upper conveyor with respect to the lower conveyor, whereby the upper conveyor may be projected forwardly, as the coal is gathered, with means for swinging or angularly adjusting both conveyors horizontally.

A further object of the invention is to provide means for supporting the upper conveyor whereby it may be horizontally adjusted, and at the same time the forward end of the same will be free to partake of vertical movement, to accommodate itself, while contacting with the coal or like material.

A further object of the invention is to provide means for driving the longitudinally adjustable conveyor, which driving means is not affected in operation, by the adjustment of the conveyor longitudinally.

A further object of the invention is to provide a machine of the above mentioned character, all parts of which are driven from a single prime mover, through the medium of suitable gears or gearing, and the entire machine is also propelled along the track by the prime remover.

Other objects and advantages of the invention will be apparent during the course of the following description.

Figure 7:
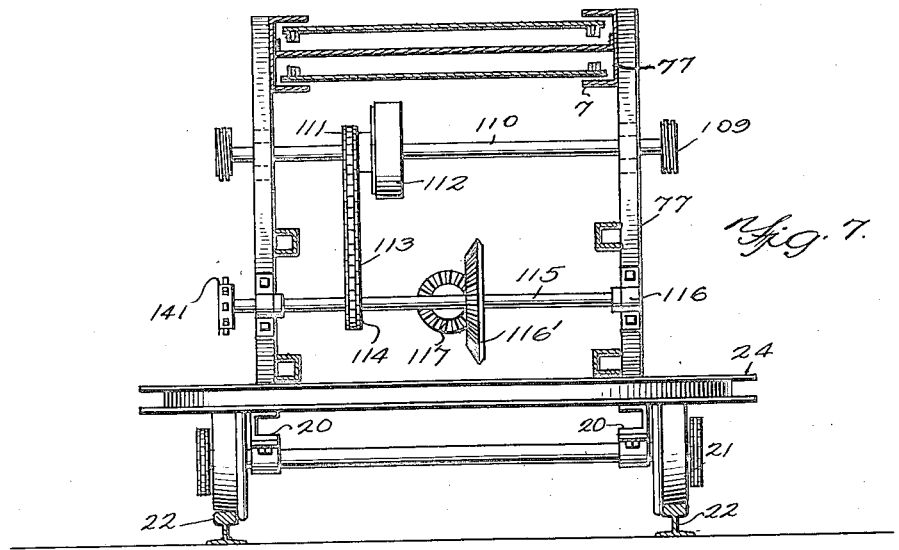
Figure 8:
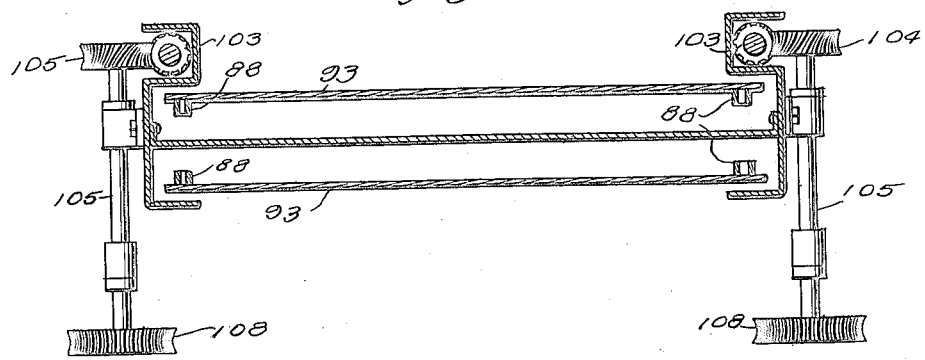
Figure 9:
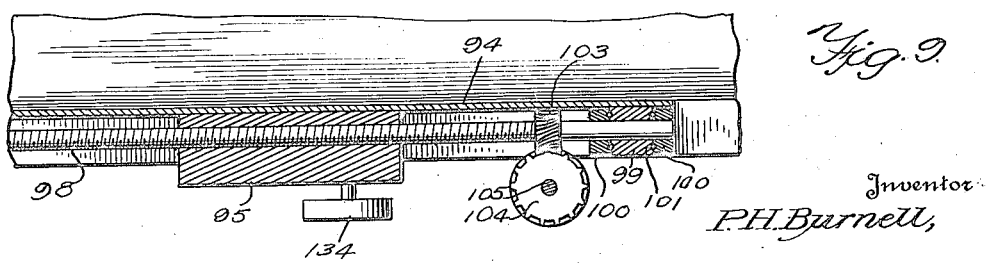

In the accompanying drawings forming a part of this specification, and in which like numerals are employed to designate like parts throughout the same, Fig. 1 is a plan view of a coal loading machine embodying my invention, Fig. 2 is a side elevation of the same, Fig. 3 is an enlarged side elevation, parts broken away, and parts in section, Fig. 4 is a transverse section taken on line 4—4 of Figure 3, Fig. 5 is an enlarged fragmentary side elevation of the machine, showing the upper end of the longitudinally adjustable conveyor, with associated elements, Fig. 6 is a transverse section taken on line 6—6 of Figure 2, Fig. 7 is a transverse section taken on line 7—7 of Figure 2, Fig. 8 is a transverse section taken on line 8—8 of Figure 5, Fig. 9 is a longitudinal section taken on line 9—9 of Figure 5, Fig. 10 is an enlarged side elevation of the upper or adjustable conveyor, showing the same distended, Fig. 11 is a central vertical longitudinal section through the same, parts broken away, Fig. 12 is a transverse section taken on line 12—12 of Figure 3, and, Fig. 13 is a transverse section taken on line 13—13 of Figure 10.

In the drawings, wherein for the purpose of illustration is shown a preferred embodiment of my invention, the numeral 20 designates a main frame, which is horizontal and supported by wheels 21, which are flanged, to travel upon track rails 22. The wheels 21 are geared to rotate together, and one wheel is driven by a sprocket wheel 23, rigidly secured thereto. The numeral 24 designates an annular turn table or track, which is rigidly mounted upon the main frame 20. Uprights or vertical standards 25 are rigidly connected with the frame 20 and constitute an upper frame work. The upper ends of these standards are connected with the sides 26 of a discharge conveyor. These sides may be in the form of channel-beams, as more clearly shown in Figure 6.

As more clearly shown in Figures 3 and 6, a bearing 27 is provided, carried by a transverse bar 28, which is rigidly attached to the channel-beams 26 of the rear discharge conveyor. The bearing 27 receives a vertical king shaft 29, the lower end of which is in a bearing 30 rigidly secured to transverse beams 31, rigidly mounted upon the sides of the main frame 20, as shown. The end thrust bearing 32 is rigidly mounted upon the lower end of the king shaft 29 and is arranged opposite the flange 30' of the bearing 30, with balls 33 therebetween.

The numeral 34 designates a horizontal swinging frame as a whole, embodying upper and lower longitudinal beams 35 and 36, which are suitably braced and connected. This frame has its intermediate portion slidably contacting with the turn table 24, as shown. The rear ends of the lower beams 36 converge or extend inwardly, the beams 36 being preferably channel bars, as clearly shown in Figure 6. Beams 36, Figure 6, are rigidly connected with a clutch head or element 37, which is slidably mounted upon the king shaft 29. A co-acting clutch head or element 38 is rigidly mounted upon the king shaft 29, above the first named clutch head, and has apertures 39 formed therein, receiving locking elements or fingers 40, adapted to enter openings 41 in the clutch head 37, whereby these clutch heads may be locked together. Balls 42 are interposed between the contacting faces of these two clutch heads. The fingers 40 depend from a shifting ring 43, loosely mounted upon the hub 44 of the clutch head 38, and this shifting ring is normally held elevated by a spring 45, and is depressed by any suitable means, such as the usual forked shifting lever (not shown). A main horizontal bevel gear 46 is rigidly mounted upon the king shaft 29 above the clutch head 38, and a thrust ball bearing structure 47 is interposed between the horizontal bevelled gear 46 and the bearing 27, as shown. The channel beams 36 have pivotal connection with hub of gear 46.

Pivotally connected with the forward and rear ends of the channel-beams 26 of the rear discharge conveyor, are transverse shafts 48 and 49 having sprocket wheels 50 rigidly mounted thereon inwardly of the channel-beams or sides 26. These sprocket wheels support endless sprocket chains 51, operating beneath guides 52, and an endless belt 53, made of canvas or the like, is secured to these endless sprocket chains, preferably near its marginal edges. A division plate 54 is arranged inwardly of the endless conveyor and serves to connect the side channel beams 26, and also to support the upper length of the endless conveyor, should the same sag. The endless conveyor is driven by a sprocket wheel 55, rigidly secured to the end of the shaft 49, outwardly of the channel beam 26, and this sprocket wheel is engaged by a sprocket chain 56, extending forwardly to engage the sprocket wheel 57, Figure 12. The sprocket wheel 57 is rigidly mounted upon a transverse shaft 58, carrying a sprocket wheel 59 rigidly secured thereto, driven by a depending sprocket chain 60, engaging a sprocket wheel 61. The sprocket wheel 61 is rigidly mounted upon a lower transverse shaft 62, having a bevelled gear 63 rigidly mounted thereon. This bevelled gear is driven by a bevelled gear 64, Figure 3, rigidly mounted upon a longitudinal shaft 65, journaled in a bearing 66, supported upon a transverse beam 67. The numeral 68 designates a prime mover, preferably in the form of an electric motor, while any other suitable form of prime mover may be employed. This prime mover is mounted upon transverse beams 69, secured to the main frame 20. The armature shaft 70 of the prime mover or motor is connected with the shaft 65 through the medium of a friction clutch 71, which may be operated by any suitable means, such as the usual shifting lever, as well known. This prime mover is arranged to the rear of the king shaft 29, and the forward end of the armature shaft 70 is connected with a forward longitudinal shaft 72 through the medium of a friction clutch 73, operated by any suitable means. Shaft 72 is journaled in a bearing 74, supported by a transverse beam 75, secured to selected standards 25. The shaft 72 has a bevelled gear 76 rigidly secured to its forward end, and this bevelled gear engages the bevelled gear 46, to drive the same. The numeral 77, Figures 2, 5, 4 and 7, designates inclined channel-beams, constituting the sides of a lower take up conveyor. These channel-beams 77 are rigidly mounted upon the frame 34, at 78, and are also rigidly connected with vertical standards 79, near their rear ends. These vertical standards are rigidly mounted upon the sides of the frame 34, see Figure 5. The rear ends of the channel-beams 77 are preferably horizontal as shown at 80, and this rear end overlaps the forward end of the rear discharge conveyor, to deliver coal or the like therealong. A transverse shaft 86 is pivotally connected with the rear ends of the channel beams 77, Figures 2 and 3, and carries sprocket wheels 87, engaged by endless sprocket chains 88, extending longitudinally of the channel beams 77, for engaging sprocket wheels 89, Figure 13, rigidly mounted upon a transverse shaft 90, journaled through openings in the forward ends of the beams 77. A sprocket wheel 91 is rigidly mounted upon the shaft 90 to drive the endless sprocket chains, and this sprocket wheel is driven by a sprocket chain 92, to be more fully described. An endless conveyor 93 is attached to the endless sprocket chains 88, near its marginal edges, and a dividing and supporting plate 94 is arranged between the channel-beams 77, and serves to connect the same. The channel-beams 77, see Figure 4 in particular, have their material extended at their top forming longitudinal guide channels 94, which are U-shaped in cross section. These guide channels are integral with the channel-beams and extend longitudinally thereof at the tops of the same. The numeral 95 designates carriages or slides, having blocks 96, slidable within the guides 94. These blocks are slidably mounted upon the tops of the channel-beams 77, and the blocks 96 have screw-threaded openings 97, to receive shifting screws 98, which extend longitudinally through and within the guides 94. The upper ends of each shifting screw 98, Figure 9, is journaled in a bearing 99, rigidly mounted in the upper end of the channel guide 94, and thrust bearings 100 are rigidly mounted upon the shifting screw 98, and arranged upon opposite sides of the bearing 99, with balls 101, interposed between the same. The forward or lower ends of the guide channels 94 project beyond the channel-beams 77 and a bearing 102, similar to the bearing 99 is held in the lower end of the guide 94, and rotatably receives the lower end of the shifting screw 98.

The shifting screws 98 have worm wheels 103, rigidly secured to their upper ends, Figure 8, and these worm wheels are driven by worm wheels 104, rigidly mounted upon upstanding shafts 105. These upstanding shafts are journaled through bearings 106, secured to the channel-beams 77, and bearings 107, secured to the standards 79 and the lower ends of the shafts 105 are rigidly connected with the worm wheels 108, driven by worm wheels 109, rigidly mounted upon a transverse shaft 110, carried by the standards 77. The shaft 110 receives its rotation from a sprocket wheel 111, through the medium of reverse gearing 112, mounted upon the shaft 110. This reverse gearing may be of any suitable type, it being sufficient that any gearing may be employed which will alternately rotate the shaft 110 in opposite directions. The sprocket wheel 111 is driven by a sprocket chain 113, extending downwardly to engage a sprocket wheel 114, Figures 3 and 7, rigidly mounted upon a transverse shaft 115, journaled through bearings 116. The shaft 115 has a bevelled gear 116' rigidly mounted thereon, engaged by a bevelled gear 117, Figure 3, carried by a longitudinal shaft 118. The shaft 118 is journaled in a bearing 119, and is connected with a shaft 120, through the medium of the clutch 121, operated by any suitable means. Shaft 120 is journaled in a bearing 122, and carries a bevelled gear 123, permanently engaging the main bevelled gear 46. From the foregoing description it will be seen that the rotation of the bevelled gear 46 is transmitted to the shifting screws 98, through the medium of the reversing gear 112 and associated elements, whereby the screws 98 may be rotated in either direction. This operation is effected without disturbing the operation of the endless conveyor 93, as will be more carefully explained.

The numeral 124 designates upper and longitudinally adjustable take up conveyor embodying longitudinal beams 125, which are channel beams, as more clearly shown in Figure 4. Beams 125 are slidably mounted upon the guide channels 94, Figure 4, and these beams move longitudinally of the channel beams 77, and with the carriages 95. As clearly shown in Figure 4, upper ends of the channel beams 125 have openings for pivotally receiving a transverse shaft 126, having sprocket wheels 127 rigidly mounted thereon. The shaft 126 is also journaled in openings 128, formed in the carriages 95. The sprocket wheels 127 receive endless sprocket chains 129, Figures 3 and 11 and these sprocket chains engage sprocket wheels 130, rigidly mounted upon a transverse shaft 131, pivotally connected with the forward ends of the channel-beams 125. An endless conveyor 132 is secured to the endless chains 129.

The shaft 126 is driven by a sprocket wheel 133, Figures 5 and 10, rigidly mounted thereon exteriorly of the carriage 95. This sprocket wheel 133 is engaged by the sprocket chain 92. The sprocket chain passes beneath guide wheels 134, secured to the carriage 94. The rear portion of the sprocket chain 92 passes about a sprocket wheel 135, rigidly mounted upon a shaft 136, which is journaled through bearings 137, rigidly mounted upon the channel-beams 77, Figures 3 and 5. On the opposite end of the shaft 135 is a sprocket wheel 139, engaged by a sprocket chain 140 extending downwardly to engage a sprocket wheel 141, rigidly mounted upon the shaft 115. It is thus seen that the sprocket chain 92 serves to drive the upper and lower endless take up conveyors, and that this driving operation is not affected by the longitudinal movement of the upper conveyor 134 with relation to the lower conveyor.

The forward end of the upper conveyor 124 rests upon the channel-beams 77, and is free from connection therewith, and hence the forward end of the conveyor 124 is adapted to rise with relation to the lower channel beams 77, and for this purpose upstanding guides 142 are secured to the channel-beams 77, and project upwardly beyond the channel-beams 125, upon opposite sides thereof.

The numeral 143 designates side aprons, having openings 144 cut therein to receive the forward ends of the channel beams 125, and these channel-beams are rigidly secured in these openings. The aprons 143 extend above the channel-beams 125 and are connected by a transverse bar 145, carrying spaced tines 146, the rear ends of which are rigidly mounted upon a transverse bar 147, attached to the channel-beams 125, adjacent the intake end of the endless conveyor 132.

The numeral 62' designates a clutch, carried by the shaft 62, to lock and unlock a sprocket wheel 64' thereto. This clutch may be operated by the usual shifting lever. The sprocket wheel 64' is engaged by a sprocket chain 23', engaging the sprocket wheel 23.

The operation of the machine is as follows:

When it is desired to propel the machine longitudinally of the track 22, the clutch 62' is rendered active, while the friction clutches 73, 121 and the reversing gearing 112 may be rendered idle, if desired. The friction clutch 71 may be operated to control the speed at which the shaft 62 will be driven, and the rotation of this shaft will be transmitted to the wheel 21. The machine may then be driven forwardly, and may be driven rearwardly, by reversing the direction of operation of the motor. The clutch 62' is rendered idle when the machine is brought to the desired location upon the track. To swing the frame 34 horizontally, the clutch 73 may be operated to suitably reduce the speed of the motor, and the shifting ring 43 is lowered, whereby fingers 40 will lock the clutch head 38 to the clutch head 39, as the clutch head 38 is rigidly mounted upon the king shaft 29, and the clutch head 39 rigidly secured to the frame 34, this frame will be swung about the king shaft 29 as a pivot. The frame 34 may be swung in opposite directions by reversing the direction of operation of the motor 68. The frame 34 and the upper and lower take up endless conveyors carried thereby may thus be swung to either side of the main frame of the machine, at various angles within a radius of 180°. With the frame 34 in the desired position, the motor 68 through the medium of the gearing, drives the discharge endless belt clockwise, and the upper and lower take up endless belts or conveyors in the same direction. The coal delivered to the upper take up endless conveyor 132 is carried upwardly and rearwardly thereby, and dumped upon the lower endless conveyor 93, and is carried rearwardly thereby to the conveyor 53, which discharges the same at its rear end, into a mining car or the like. During this operation the reversing gear 112 is idle so that it will not drive the shaft 110. Should it be desired to shift the upper take up conveyor 124 forwardly, so that its forward end is moved in proximity to the coal or the like, the gearing 112 is suitably actuated to rotate the shaft 110 in the direction whereby the feed screws 98 are rotated in the proper direction to shift the carriages 95 forwardly. The channel beams 125 now slide upon the guide channels 94, and the forward end of the conveyor 124 is free to rise slightly, to accommodate itself to the irregularities in the coal which it engages. By virtue of the peculiar arrangement of the sprocket chains 92 and sprocket wheels 133 and 135, the longitudinal movement of the conveyor 124 does not affect the operation or travel of the endless conveyor 132, or the travel of the lower endless conveyor 93, both of which are driven by the sprocket chains 92. The gearing 112 may be actuated to cause the upper conveyor 124 to travel rearwardly, and this gearing is also adapted to be actuated to render the same neutral or inoperative so that it does not drive the shaft 110, whereby the conveyor 124 will remain in the longitudinal adjusted position when shifted thereto.

It is to be understood that the form of my invention herewith shown and described, is to be taken as a preferred example of the same and that various changes in the shape, size, and arrangement of parts may be resorted to without departing from the spirit of my invention or the scope of the subjoined claims.

Having thus described my invention, I claim:

1. In a machine of the character described, a supporting frame, a discharge conveyor carried thereby, a lower take up conveyor carried by the supporting frame and embodying a rotatable element to drive it, an upper take up conveyor arranged above the lower take up conveyor and movable longitudinally thereof and embodying a rotatable element to drive the same, a single endless flexible element engaging and driving the rotatable elements, a rotatable element engaging and driving the endless flexible element, and means for effecting the longitudinal movement of the upper take up conveyor without disturbing the driving of the upper and lower conveyors, said means comprising carriages secured to the upper take up conveyor and slidably mounted upon the lower take up conveyor, feed screws engaging the carriages to move them longitudinally, and motor driven means to rotate the feed screws.

2. In a machine of the character described, a supporting frame, a discharge conveyor carried thereby, a lower take up conveyor carried by the supporting frame, adapted to deliver material to the discharge conveyor, an upper take up conveyor arranged above the lower take up conveyor and movable longitudinally thereof, carriages secured to the upper take up conveyor near its rear end and directly slidably mounted upon the lower take up conveyor the forward end of the upper conveyor being vertically movable, feed screws extending longitudinally of the lower take up conveyor in substantially parallel relation thereto and mounted thereon and engaging the carriages to move them longitudinally, means to rotate the feed screws, and common means to drive the upper and lower take up conveyors, said common means being independent in operation of the longitudinal adjustment of the upper take up conveyor.

3. In a machine of the character described, a supporting frame, a lower take up conveyor embodying spaced side beams secured to the supporting frame and an endless belt conveyor operating between the side beams, guide channels carried by the upper edges of the side beams and extending longitudinally thereof, an upper take up conveyor arranged above the lower take up conveyor and embodying spaced side beams adapted to rest upon the longitudinal guide channels and an endless conveyor operating between the side beam, carriages secured to the side beams of the upper take up conveyor and having blocks slidably mounted within the guide channels, said blocks having screw threaded openings, feed screws extending longitudinally within the guide channels and operating within the screw threaded openings of said blocks and connected with the side beams of the lower take up conveyor, means to drive the feed screws, a wheel connected with the endless belt of the lower take up conveyor to drive it, a wheel connected with the endless belt of the upper take up conveyor to drive it, an endless element engaging the wheels to rotate the same, rotatable elements engaging the endless element near and upon opposite sides of the wheel of the upper take up conveyor, and a wheel engaging the endless element to drive the same.

4. In a machine of the character described, a wheeled frame, a vertical king shaft secured thereto, a discharge conveyor carried by the frame and arranged upon one side of the king shaft, a motor mounted upon the frame upon the same side of the king shaft, driving connecting means between the motor and the discharge conveyor, a swinging frame arranged upon the wheeled frame upon the opposite side of the king shaft and pivotally mounted upon the said king shaft, a gear carried by the king shaft, driving connecting means between the gear and said motor, a clutch device to lock the king shaft with the swinging frame, a lower take up conveyor carried by the swinging frame and discharging upon the discharge conveyor, a longitudinally movable upper take up conveyor arranged above and supported by the lower take up conveyor, means driven from said gear to drive the upper and lower take up conveyors, and means driven by said gear to shift the upper conveyor longitudinally of the lower conveyor.

5. In a machine of the character described, a wheeled frame, a vertical king shaft secured thereto, a discharge conveyor carried by the frame and arranged upon one side of the king shaft, a motor mounted upon the frame beneath the conveyor and upon the same side of the king shaft, connecting means between the motor and said conveyor, driving means between the motor and the wheels of said wheeled frame, a swinging frame mounted upon the opposite side of the frame, and pivotally connected with the king shaft, a gear rigidly mounted upon the king shaft, driving means between the gear and motor, a clutch device to lock the swinging frame to the king shaft to turn therewith, a lower take up conveyor mounted upon the swinging frame, an upper take up conveyor mounted upon the lower take up conveyor to move longitudinally thereof, driving means between said gear and the upper and lower take up conveyors, means to feed the upper take up conveyor longitudinally, and a reversing gearing operating the feeding means and driven by said gear.

6. In a machine of the character described, a supporting frame, a discharge conveyor connected therewith, a swinging frame carried by the supporting frame, a lower take up conveyor carried by the swinging frame, an upper take up conveyor having its rear end pivotally connected with the lower take up conveyor so that its forward end is capable of swinging vertically with relation thereto, and means for moving the upper take up conveyor longitudinally with respect to the lower take up conveyor.

7. In a machine of the character described, a supporting frame, a discharge conveyor connected therewith, a swinging frame carried by the supporting frame, a lower take up conveyor carried by the swinging frame and discharging upon the discharge conveyor, carriages mounted upon the lower take up conveyor to move longitudinally thereof, an upper take up conveyor having its rear end pivotally connected with the carriages and its forward end capable of swinging vertically with relation to the lower take up conveyor, means to move the carriages longitudinally of the lower take up conveyor, and means to drive the upper and lower take up conveyors independently of the longitudinal movement of the upper take up conveyor.

8. In a machine of the character described, a frame, a discharge conveyor connected therewith, a take up conveyor carried by the frame, a second take up conveyor arranged above the first named take up conveyor, carriages mounted upon the first named take up conveyor to move longitudinally thereof and pivotally connected with the rear end of the second named take up conveyor, guide elements secured to the first named take up conveyor and arranged upon opposite sides of the second named take up conveyor, means to move the carriages longitudinally of the first named take up conveyor, and means to drive the first and second named take up conveyors.

In testimony whereof I affix my signature.

PATRICK H. BURNELL.